L. DUFEK.
EMERGENCY BRAKE.
APPLICATION FILED AUG. 21, 1916.

1,220,613.

Patented Mar. 27, 1917.

Inventor
Louis Dufek
By Fred P. Porin
Attorney

UNITED STATES PATENT OFFICE.

LOUIS DUFEK, OF BREMERTON, WASHINGTON.

EMERGENCY-BRAKE.

1,220,613.

Specification of Letters Patent.

Patented Mar. 27, 1917.

Application filed August 21, 1916. Serial No. 115,920.

*To all whom it may concern:*

Be it known that I, LOUIS DUFEK, a citizen of the United States, and a resident of Bremerton, in the county of Kitsap and State of Washington, have invented certain new and useful Improvements in Emergency-Brakes, of which the following is a full, true, and exact specification.

My invention relates to emergency brakes for motor vehicles and more particularly to brakes for automobiles and has for its principal object; to provide a simple and novel braking means which may be easily thrown down in contact with the road surface or pavement and which, when brought into contact with the pavement or road surface will quickly release the rear wheels or drive from contact with the road surface, thereby cutting off the driving action of the wheels; to provide power operating means for releasing the said brake and again lowering wheels into contact with the road. In driving an automobile it is frequently necessary to use all possible effort to stop the machine even though the machine itself might receive some injury and the road surface may be torn up or injured. My device is designed to operate in such a case.

Other objects will appear as my invention is more fully explained in the following specification, illustrated in the accompanying drawings and pointed out in the appended claim.

Figure 2:
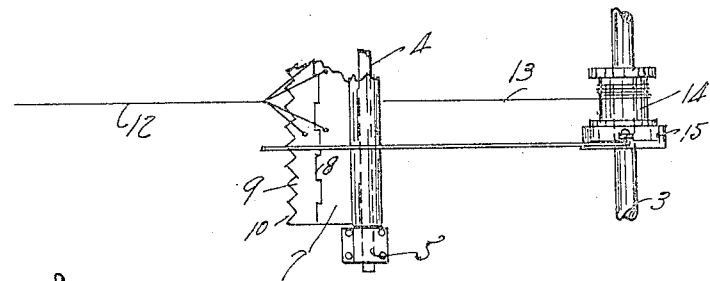
Figure 1:
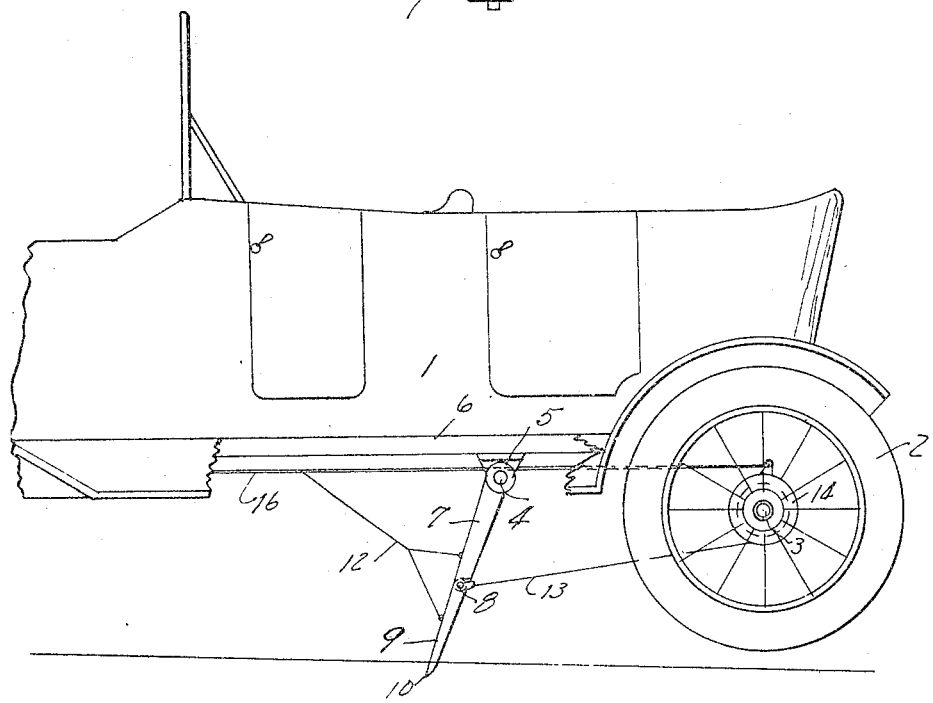

In the drawings Figure 1 is a side elevation of a portion of an automobile with my device shown in operative position. Fig. 2 is a fragmentary plan view of my device shown removed from the automobile body.

Referring more particularly to the drawings, numeral 1 indicates the body of an automobile which has rear wheels 2 mounted upon an axle 3. All of the above features are usual. My device embodies a shaft 4 which is mounted on bearings 5. The bearings 5 are secured to the chassis 6 of the machine. A brake bar 7 is swingably mounted on shaft 4 and is provided with a hinge 8 located about two-thirds of its length of the shaft 4. Hinged to the lower end of brake bar 7 is an extension brake bar 9 which is free to swing toward the front of the car but is not free to swing to the rear of a position which would be continuous with the bar 7. Extension bar 9 may be provided with teeth 10 at its lower end. A check line 12 is attached at the forward end to a release lever (not shown) which is located adjacent the driver's seat. The other end of the check line is divided and attached both to the brake bar 7 and the extension bar 9 so as to control them both. A release line 13 is secured at one end at hinge point 8 and the other end is wound around a loose drum 14. Drum 14 is loosely mounted on shaft 3 and is provided with a mechanism clutch 15 which is secured to the shaft 3 and which is used to set the drum in motion. A clutch rod 16 operates the clutch 15 from the driver's seat. In operating my device the brake bar 7 and extension bar 9 are normally held up close in under the chassis and in an emergency are quickly released until they drop down into position as shown in Fig. 1. When in this position the extension rod 9 has engaged the pavement and has raised the rear wheels of the machine above the ground so that they no longer possess any attractive value. The contact of the extension bar with the pavement as well as the releasing of the traction wheels from contact with the pavement will effectually stop the automobile. When it is desired to release the braking device it is only necessary to let a little more slack into the check line 12, throw in the clutch 15 and start the engine of the automobile. The operation of the engine will revolve the rear axle and the drum 14 which will wind up the line 13 and collapse the brake bars and allow the rear wheels to drop down into contact with the road surface. The device may then be raised into its normal position beneath the chassis.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention what I claim as new and desire to protect by Letters Patent, is—

In the combination with a motor driven vehicle emergency braking means, said means including a brake bar pivotally mounted on the vehicle chassis, an extension brake bar hinged to the lower end of the first mentioned bar, and check line means for lowering and retaining the said brake bars in contact with the road surface, and power operated brake bar releasing means.

LOUIS DUFEK.